United States Patent [19]

Gefvert

[11] Patent Number: 5,256,187
[45] Date of Patent: Oct. 26, 1993

[54] SEPARATION OF PRECIOUS METALS BY AN ION EXCHANGE PROCESS

[75] Inventor: David L. Gefvert, Dublin, Ohio

[73] Assignee: Sherex Chemical Company, Inc., Dublin, Ohio

[21] Appl. No.: 975,062

[22] Filed: Nov. 12, 1992

[51] Int. Cl.⁵ ............................................. C22B 3/24
[52] U.S. Cl. ........................................ 75/717; 75/718; 75/720; 423/22; 423/24; 423/139
[58] Field of Search ................ 75/741, 711, 720, 717, 75/718; 423/22, 24, 139

[56] References Cited

U.S. PATENT DOCUMENTS

| | | |
|---|---|---|
| 3,637,711 | 1/1972 | Budde, Jr. et al. . |
| 3,725,046 | 4/1973 | Hartlage et al. . |
| 3,882,053 | 5/1975 | Corte et al. . |
| 3,933,872 | 1/1976 | Hartlage . |
| 3,989,650 | 11/1976 | Lange et al. . |
| 4,066,652 | 1/1978 | Hartlage . |
| 4,067,802 | 1/1978 | Cronberg et al. . |
| 4,205,048 | 5/1980 | Kyung et al. . |
| 4,389,379 | 6/1983 | Rouillard epouse Bauer et al. . |
| 4,568,526 | 2/1986 | Rouillard nee Bauer et al. . |
| 4,592,779 | 6/1986 | Russ et al. ............................. 75/741 |
| 4,654,145 | 3/1987 | Demopoulos et al. . |
| 4,855,114 | 8/1989 | Gefvert . |
| 4,913,730 | 4/1990 | Deschenes et al. .................. 75/720 |
| 5,134,169 | 7/1992 | Green et al. ......................... 210/688 |

OTHER PUBLICATIONS

Pouskouleli, "Recovery and Separation of Platinum and Palladium by coextraction and Differential Stripping", pp. 174–188. *Separation Processes in Hydrometallurgy* Jul. 1987.

*Primary Examiner*—Melvyn J. Andrews
*Attorney, Agent, or Firm*—Scully, Scott, Murphy & Presser

[57] ABSTRACT

The present invention relates to the extraction and separation of low concentrations of precious group metals from acid chloride solutions, which are obtained by leaching catalytic converters, by utilizing a 8-hydroxyquinoline containing resin and a thiourea stripping process. The said process eliminates the phase separation problems and reagent losses which are normally associated with prior art methods. In addition to being used as a catalytic converter recycler, the present invention can be also employed by waste water treatment plants.

15 Claims, No Drawings

SEPARATION OF PRECIOUS METALS BY AN ION EXCHANGE PROCESS

FIELD OF THE INVENTION

The invention relates to an improved method for recovering precious metals from various processing streams by employing a selective ion exchange resin followed by subsequent stripping to remove essentially contaminant free precious metals. A preferred aspect of the invention concerns the recovery of lead-free Pd and Pt by using a 8-hydroxyquinoline treated resin followed by elution of the precious metals by an acidic thiourea stripping process.

BACKGROUND OF THE PRIOR ART

The increasing demand for platinum group metal use in industrial applications has made an impact on the industrial practice of recovering and refining precious methods. To meet this challenge, the classical precipitation techniques are being abandoned for more modern separation methods. Among the latter, solvent extraction (SX) has proven to be a suitable and powerful separation technique for the precious group metals.

Briefly, solvent extraction comprises two steps. In the first, the extraction step, dilute aqueous feed solution, containing the metal ion(s) to be recovered, is mixed with an immiscible hydrocarbon diluent or carrier containing a liquid ion exchanger or ligand dissolved therein, and the resulting metal chelate migrates to the organic phase. In the second, the stripping step, the separated "loaded" organic phase is mixed with an aqueous solution of a stripping agent (e.g., sulfuric acid) and the procedure is reversed, the metal ion passing back to the new aqueous phase. As a consequence, the dilute feed solution is converted into a highly concentrated solution, from which the metal values are more readily recovered, e.g., by electrolysis.

Despite, however, the superior performance of the SX process, these methods are not without their drawbacks The principal cause for their weaknesses is that the reagents used are not necessarily compatible with PGM-bearing feedstock solutions. In addition when the concentration of the desired metals is low, recovery and separation of Pt and Pd using SX methods are extremely difficult.

One way of overcoming these drawbacks is to employ an ion-exchange resin which contains a complexing or extracting agent. In this case, the desired precious metals are physically absorbed onto the resin and removal is accomplished by acid washing.

The compound 8-hydroxyquinoline is well known for its ability to coordinate with a variety of transition metal ions through covalent bonding to form a stable 5-membered ring via metal chelation. Recently, however, the ability of 8-hydroxyquinoline to form chelates with platinum group metals has been employed in SX of feed streams containing such precious metals. Unfortunately, this extracting agent is not sufficiently soluble in the hydrocarbon solvents employed in the first step of the SX process, and it is too soluble in the acidic aqueous stripping phases. The deficiencies of 8-hydroxyquinoline can be overcome by attaching 8-hydroxyquinoline to a resin backbone.

Resins developed by Bayer in U.S. Pat. Nos. 3,882,053 and 3,989,650 contain aminoethyl terminated cross linked polymers. In DE Patent No. 50153.00A, the aminoalkyl terminated cross linked polymers are further modified by condensation of these amines with 8-hydroxyquinoline and aldehydes. This reaction results in a chemical bond between the hydroxyquinoline and the resin. This chemically modified resin was then used to extract precious group metals from their acid chloride feeds. The said condensation discussed above is believed to generate additional chelating sites on the resin; however, it was determined that Pt could not be removed from the resin by normal water washing process.

A growing industrial concern involves the recovery of Pd, Pt and Rh from spent automotive catalytic converters. Because of the low levels of such precious metals and the high levels of contaminants found in the solutions obtained by leaching catalytic converters, prior art methods do not offer an efficient way of cleanly separating these metals. Additionally, these methods usually result in a lead-contaminated Pt solution. Thus, it would be extremely beneficial if a recovery process could be developed which can separate low levels of precious metals, i.e. platinum group metals, and eliminate contamination of the final solution.

SUMMARY OF THE INVENTION

The present invention relates to the extraction and separation of low concentrations of precious metals from acid halide solutions which are obtained by leaching catalytic converters, by utilizing a 8-hydroxyquinoline containing resin and a thiourea stripping process. The said process eliminates the phase separation problems and reagent losses which are normally associated with prior art methods. In addition to being useful in recycling of metals used in e.g. catalytic converters, the present invention can also be employed by waste water treatment plants.

DETAILED DESCRIPTION

The present invention provides a method for recovery of precious metals from various process streams by employing a selective ion exchange resin and a stripping step. The process is applicable to the treatment of acid chloride solutions containing one or more precious metals selected from the group consisting of iron, cobalt, nickel, copper, ruthenium, rhodium, palladium, silver, osmium, iridium, platinum and gold and mixtures thereof. A preferred embodiment of the invention relates to the recovery of platinum, palladium and gold from acid chloride solutions. More specifically, the invention described herein involves the recovery of Pt and Pd from catalytic converters.

The said process is utilized for the extraction of said precious metals from a dilute aqueous halide solution by contacting the solution with an ion exchange type resin followed by subsequent stripping of the precious metal values. It is a preferred embodiment of the invention that the ion exchange resin contains chelating sites which allow for the selective elution of lead and other contaminants. The elution of the precious metal values from the lead-free resin is then accomplished by employing an acidic thiourea solution.

The present invention can be applied to any level of precious metals contained in the liquor. It is especially useful for the recovery of Pd and Pt from chloride feed liquors containing from about 100 to about 300 ppm of Pt and from about 50 to about 100 ppm of Pd. In addition to the precious metals, the chloride feed liquors may contain any combination of metallic contaminants including any selected from the group consisting of lead, aluminum, barium, cerium, zirconium, iron, copper and zinc.

The chloride feed liquors can result from treatment of precious group metal slimes resulting from the electro-refining of copper, or treatment of precious metal-containing scrap such as electronic circuit boards, plating effluents, or refractory gold ore. As previously mentioned, the present process is especially successful when the precious metal levels are low. For example, the solutions obtained from the leaching of spent automobile catalytic converters are well suited for this process.

The characteristics of feed liquors that can be treated by this process have few limitations, provided that the feed liquor contains sufficient amounts of halide ion to maintain the precious metal values in solution. However, excess amounts of nitrating agents are not recommended since they destroy the ability of the resins to perform normally.

The precious metal solutions are normally the result of oxidative chloride leaching of the raw material. This involves first leaching the finely divided material with a hydrochloric acid solution that contains an oxidizing agent. Typical oxidizing agents that can be used include hydrogen peroxide, chlorine, chlorate, perchlorate, and permanganate. Another preferred embodiment of the invention is that the platinum should be maintained in a +4 valence state whereas palladium and gold are normally at +2 and +3 valence states respectively.

The resins suitable for the process of the invention must be substantially insoluble in and essentially unaffected by the leaching solutions. Additionally, the desired resin must have a chelating function sufficiently strong to be able to form a complex with the precious metal so that the metal values can be selectively removed from the feed. Further, the resin must allow for the precious metals to be selectively removed from the resin bed by thiourea elution process. The chelating agent can be either physically or chemically deposited on the resin. It is a preferred aspect of the invention that the chelating agent be attached to the resin backbone by a covalent bond. This type of resin-chelate bond assures that the chelating agent will not be removed during the extraction or separation process. Chelating structures which are suited in this process include 8-hydroxyquinoline and iminodiacetic acid or any derivatives thereof. These agents are well known to form strong chelates with precious group metals; however, they do not bind or chelate the contaminants which may be present in the feed liquor. Therefore, cross contamination of the mixture is avoided. Thus, the resin bed is essentially free of contaminants prior to the stripping process.

One preferred resin used in this process contains iminodiacetic acid. This polymer type resin is previously reported to contain a styrene divinylbenzene copolymer having iminodiacetic acid functional groups directly bonded to it. This particular resin is especially stable under either acidic or basic conditions (i.e. pH 1-14).

In another preferred embodiment, a resin described in DE 50153.00A is particularly preferred for use in this process. This resin is also a polymer system which contains a styrene-divinylbenzene copolymer. Additionally, 8-hydroxyquinoline is attached to this polymer backbone through covalent bonding.

The resins employed by this process are usually conditioned prior to the extraction process. This conditioning step involves a continuous washing with about 2 to about 6M HCl until the effluent is essentially colorless. The resin is then washed with deionized water until a neutral pH is obtained.

The resin is then contacted with the solution from which it is desired that the metal values be extracted. Contact can be batchwise, i.e., in a reactor vessel that is preferably undergoing mild agitation, or continuous, i.e., in a concurrent or countercurrent column. The relative amount of resin to solution for effective extraction is readily ascertained.

The chelated precious metal values are then washed off the resin by using a thiourea stripping solution. Washing for a sufficient time with water (deionized or doubly distilled) alone results in the removal of lead from the resin but not the precious metals. Washing thereafter with an appropriate acidified thiourea stripping solution results in removal of the precious metals present from the resin backbone. It is preferred that the thiourea solution contain from about 1 to about 6M HCl, especially from about 2 to about 3M HCl. Another preferred embodiment of the present invention is that the stripping solution contains from about 0.01 to about 2M thiourea, especially from about 0.1 to about 1M thiourea, in 2M HCl. Other acids which can be used to dilute the thiourea besides HCl include $H_2SO_4$. This acidified thiourea solution is essentially sufficient to remove the precious metals from the polymer backbone without destroying the covalent bond between the chelating agent and the polymer backbone of the resin described herein.

The precious metal values isolated by this process are in the form of thiourea complexes in a solution containing HCl. The precious metals may be precipitated from this acidic thiourea solution by the addition of a strong alkaline solution, such as a solution of sodium hydroxide. The precipitated metals can be redissolved in HCl to obtain concentrated solutions free of contaminating base metals. The precious metals may then be separated by means well known in the art. Alternatively, a precious metal powder can be obtained by reducing the thiourea solution with hydrogen. The thiourea solution can be recycled to stripping and the precious metal alloy powder refined by conventional methods.

The following examples, which are for purposes of illustration and not limitation, will further describe the invention.

SUMMARY OF TABLES

I. Represents The Analysis of Column Feed and Column Raffinate Solutions for Pt, Pb and Pd.
II. Represents the Analysis of the Wash Water After Passing 700 ml of Acid Chloride Solution Through The Column
III. Represents the Analysis of Column Feed and Column Raffinate Solution for Pt, Pb and Pd.
IV. Determination of Optimal Thiourea Solution.
V. Determination of Optimal HCl Concentration in the Optimal Thiourea Solution
VI. Determination of Optimal Thiourea Concentration in 2M HCl Solution
VII. Determination of Resin Bed Efficiency During the Stripping Process

EXAMPLE 1

Two grams of a polymer A based on iminodiacetic acid (IonacSR-5Sybron Chemicals Inc.) were treated with 40 ml of a 3M HCl solution for 30 min. and then washed thoroughly with water. Polymer A was then contacted with 11 ml of an acid leached solution for 2 hours. The leached solution contained 100 ppm of Pt, 120 ppm of Pd and 315 ppm of Pb and was 2.5 ml in HCl. After this time period, the system was filtered and the filtrate was analyzed for levels of PGM. The filtrate was determined by chemical analysis to contain 96 ppm of Pt, 70 ppm of Pd, and 250 ppm of Pb. This indicates that a significant amount of Pd and Pb was extracted in this process.

The filtered resin was then washed with 100 ml of deionized water for 1 hr. and filtered. The filtrate contained no detectable amounts of Pt or Pd. However, it was determined from the ppm of lead that water contact alone was sufficient enough to strip the lead off the resin. Analysis of the filtered resin showed a positive test for Pt and Pd; however, it was negative for Pb.

The resin was then contacted with 0.2M thiourea and 2M HCl solution resulting in removal of Pt and Pd from the resin into the thiourea solution.

EXAMPLE 2

Resin B contained a 8-hydroxyquinoline structure which was covalently bonded to the resin. This resin was reported in DE 50153.00A and is uniquely suited for the process of this invention.

The resin was conditioned by continuous washing with 6M HCl until the effluent was essentially colorless. It was then water washed until a neutral pH was obtained. The resin was used in a column having sufficient volume for 100 ml of the resin.

A monolithic spent catalytic converter was crushed into one inch cubes. These cubes (approximately 250 g) were placed into a jacketed column of 700 ml capacity. The column was then heated to 100° C. and the leach liquor (6M HCl and 1% $H_2O_2$) was pumped up the column at a rate giving 70 min. retention time in the column. Leach liquor exiting the leach column passed into the bottom of the column holding 100 ml of the resin material.

At 100 ml aliquots, the leach liquor and raffinate (liquid exiting the resin column) were analyzed for Pt, Pd and Pb. The analysis is shown in Table I. The data illustrate that the column is essentially removing all the Pt, Pd and Pb. At a bed volume of about 7, there is indication that the Pb is being selectively crowded off the resin by Pd and Pt.

After 700 ml of leach liquor had passed through the resin column, the resin-bed was washed with 1.0 l of deionized water and analyzed every 100 ml for Pt, Pb and Pd. The results are shown in Table II. The data indicates a surprising selectivity for the removal of Pb from the resin by the water wash process whereas the Pd and Pt are still strongly attached to the resin. Thus, a clean separation of Pb from Pd and Pt using 8-hydroxyquinoline derivative is possible.

The resin bed containing Pt and Pd was then contacted with 2.1 l of fresh feed liquor from the leach column. The results are shown in Table III. Once again, the raffinate indicates that essentially all of the Pt and Pd is being retained on the resin, but the Pb is being crowded off.

Next, the resin bed was water washed and removed from the column. The analysis of the resin showed high levels of Pt and Pd with only trace amounts of Fe and Sn contaminants were detected. More importantly, however, was that no Pb was found.

A 3 gm sample of this resin was then treated with 50 ml of various stripping solutions containing thiourea. The results of this study are shown in Table IV. The water and $H_2SO_4$ solutions of thiourea show significant precipitation of precious group metal salts on standing. To determine the optimum thiourea acidity, the following concentration of HCl solutions containing 1M thiourea were tested (Table V). The data indicates that the optimum thiourea acidity is a solution containing approximately 3M HCl. At high acidity levels (6M HCl), a precipitate formed during standing. The optimum thiourea content in a 2M HCl solution was also determined. The results of this study are shown in Table VI.

The final study was conducted to determine the efficiency of the resin bed stripping process. About 40 ml of resin containing 0.35 g Pt and 0.23 g Pd was contacted with 0.1M thiourea in 2M HCl solution. Analysis after each 40 ml aliquot of stripping solution was acquired. The data of the experiment is shown in Table VII. The results show the ability of the thiourea solution to effectively remove PGM from the resin.

TABLE I

ANALYSIS OF COLUMN FEED AND COLUMN RAFFINATE

| Bed Volume | Column Feed | | | Column Raffinate | | |
|---|---|---|---|---|---|---|
| | Pt (ppm) | Pd (ppm) | Pb (ppm) | Pt (ppm) | Pd (ppm) | Pb (ppm) |
| 1 | 75 | 60 | 750 | — | — | — |
| 2 | 100 | 70 | 550 | — | — | — |
| 3 | 100 | 45 | 440 | — | — | — |
| 4 | 100 | 50 | 425 | — | — | — |
| 5 | 90 | 50 | 400 | — | — | — |
| 6 | 75 | 40 | 350 | — | — | — |
| 7 | 90 | 40 | 260 | — | — | 100 |

TABLE II

ANALYSIS OF WASH WATER AFTER CONTACT WITH RESIN LOADED WITH Pt, Pd, and Pb

| Bed Volume | Pt (ppm) | Pd (ppm) | Pb (ppm) |
|---|---|---|---|
| 1 | — | — | 100 |
| 2 | — | — | 300 |
| 3 | — | — | 575 |
| 4 | — | — | NA* |
| 5 | — | — | 800 |
| 6 | — | — | 350 |
| 7 | — | — | 150 |
| 8 | — | — | 50 |
| 9 | — | — | 15 |
| 10 | — | — | 10 |

*NA - not analyzed

TABLE III

ANALYSIS OF COLUMN FEED AND COLUMN RAFFINATE

| Bed Volume | Column Feed | | | Column Raffinate | | |
|---|---|---|---|---|---|---|
| | Pt (ppm) | Pd (ppm) | Pb (ppm) | Pt (ppm) | Pd (ppm) | Pb (ppm) |
| 1 | 150 | 100 | 470 | — | — | 100 |
| 2 | 100 | 75 | 300 | — | — | 75 |
| 3 | 100 | NA | 40 | — | NA | 75 |
| 4 | 100 | 60 | 180 | — | — | 60 |
| 5 | 90 | 40 | 175 | — | — | 110 |
| 6 | 50 | 50 | 110 | — | — | 160 |
| 7 | 60 | 45 | 120 | — | — | 230 |
| 8 | 65 | 25 | 90 | — | — | 220 |
| 9 | — | 30 | 85 | — | — | 225 |
| 10 | — | 25 | — | — | — | 180 |
| 11 | — | 30 | 50 | — | — | 150 |
| 12 | — | 30 | 50 | — | — | 150 |
| 13 | — | — | 100 | — | — | 150 |
| 15 | — | — | — | — | — | 100 |

TABLE III-continued

ANALYSIS OF COLUMN FEED AND COLUMN RAFFINATE

| Bed Volume | Column Feed | | | Column Raffinate | | |
|---|---|---|---|---|---|---|
| | Pt (ppm) | Pd (ppm) | Pb (ppm) | Pt (ppm) | Pd (ppm) | Pb (ppm) |
| 17 | — | — | — | — | — | — |
| 19 | — | — | 50 | — | — | — |
| 21 | — | — | — | — | — | — |

NA = Not Analyzed

TABLE IV

DETERMINATION OF OPTIMAL THIOUREA SOLUTION

| Stripping Solution | % Stripped | |
|---|---|---|
| (1M thiourea dissolved in . . . ) | Pt | Pd |
| $H_2O$ | 68 | 80 |
| $H_2SO_4$ | 68 | 77 |
| 1 M HCl | 81 | 91 |
| 2 M NaOH | 2 | 0 |

TABLE V

DETERMINATION OF OPTIMAL HCl CONCENTRATION IN THE THIOUREA STRIPPING SOLUTION

| Stripping Solution | % Stripped Off | |
|---|---|---|
| (in 1M thiourea) | Pt | Pd |
| 1 M HCl | 81 | 91 |
| 3 M HCL | 84 | 93 |
| 6 M HCl | 78 | 92 |

TABLE VI

DETERMINATION OF OPTIMAL THIOUREA CONTENT IN A 2 M HCl SOLUTION

| Stripping Solution (in 2 M HCl thiourea concentration) | % Stripped Off | |
|---|---|---|
| | Pt | Pd |
| 0.2 M | 61 | 79 |
| 0.5 M | 68 | 84 |
| 1.0 M | 63 | 85 |
| *1.0 M | 92 | 99 |

*Experiment to determine whether a column strip responds better than a batch stripping of the resin sample, the depleted resins of 0.2M and 0.5M were again contacted with 1M thiourea yielding the observed results.

TABLE VII

DETERMINATION OF THE RESIN BED EFFICIENCY DURING THE STRIPPING PROCESS

| Aliquot | Pt (ppm) | Pd (ppm) | Pb (ppm) |
|---|---|---|---|
| 1 | 15 | 0 | 0 |
| 2 | 1200 | 1000 | 0 |
| 3 | 200 | 135 | 0 |
| 4 | 200 | 100 | 0 |
| 5 | 50 | 42 | 0 |
| 6 | 50 | 20 | 0 |
| 7 | 50 | 15 | 0 |
| 8 | 0 | 10 | 0 |
| 9 | 0 | 0 | 0 |

What is claimed is:

1. In the extraction and separation of one or more precious metals selected from the group consisting Ru, Os, Co, Rh, Ir, Ni, Pd, Pt, Cu, Ag, Au and mixtures thereof from a dilute aqueous chloride feed solution thereof which also contains contaminant metal values, by contacting said feed solution with an ion exchange resin to load said one or more precious metals and contaminant metal values onto said resin and subsequently stripping said one or more metals from the resin, the improvement comprising
   a) selectively eluting said contaminant metal values from the metal-loaded ion exchange resin with deionized water or distilled water; and then
   b) stripping the precious metals from said metal-loaded ion exchange resin with an acidic thiourea stripping solution.

2. A process according to claim 1 wherein said precious metals are Pd and Pt.

3. A process according to claim 2 wherein said feed solution contains from about 1 to about 1000 ppm of Pt and from about 1 to about 1000 ppm of Pd.

4. A process according to claim 1 wherein said contaminant metal values are selected from the group consisting of Pb, Al, Ba, Ce, Zr, Zn, Cu, Fe and mixtures thereof.

5. A process according to claim 4 wherein said contaminant metal values comprise about 0 to about 2000 ppm of Pb.

6. A process according to claim 4 wherein said ion-exchange resin comprises a substituted or unsubstituted 8-hydroxyquinoline chelating agent.

7. A process according to claim 6 wherein said ion-exchange resin comprises a 7-alkyl-8-hydroxyquinoline chelating agent.

8. A process according to claim 1 wherein said ion-exchange resin comprises an iminodiacetic chelating agent.

9. A process according to claim 1 wherein said acidic thiourea solution contains from about 1M to about 4M HCl.

10. A process according to claim 9 wherein said stripping solution contains at least 0.01M thiourea.

11. A process according to claim 10 wherein said stripping solution contains from about 0.01 to 2M thiourea.

12. A process according to claim 1, further comprising, following step (b), separating a solid product comprising the stripped precious metal values from said stripping solution.

13. A process according to claim 12 wherein said separating step comprises hydrogen reduction of said solution to cause said solid product to form.

14. A process according to claim 12 wherein said separating step comprises adding a precipitant to said stripping solution to cause said solid product to form.

15. A process according to claim 14 wherein said precipitant is caustic soda.

* * * * *